United States Patent [19]

Harber et al.

[11] Patent Number: 5,647,211
[45] Date of Patent: Jul. 15, 1997

[54] FLUID CONTROL VALVE

[75] Inventors: Neil Harber, Columbia City; Brad Meyerholtz, West Lafayette, both of Ind.

[73] Assignee: Fluidrive, Inc., Brookston, Ind.

[21] Appl. No.: 611,638

[22] Filed: Mar. 6, 1996

[51] Int. Cl.[6] .......................... F16D 31/02; F15B 11/00
[52] U.S. Cl. ......................... 60/484; 91/532; 91/514
[58] Field of Search ........................... 60/488, 420, 424, 60/484; 91/514, 532, 536, 446, 444, 447, 448

[56] References Cited

U.S. PATENT DOCUMENTS

| | | |
|---|---|---|
| 3,292,723 | 12/1966 | Pinkerton et al. . |
| 3,426,799 | 2/1969 | Kintner . |
| 3,780,820 | 12/1973 | Schwab et al. . |
| 3,841,423 | 10/1974 | Holtkamp et al. . |
| 3,900,075 | 8/1975 | Chichester et al. . |
| 3,910,369 | 10/1975 | Chichester et al. . |
| 3,916,625 | 11/1975 | Holtkamp . |
| 3,918,546 | 11/1975 | Chichester et al. . |
| 3,978,937 | 9/1976 | Chichester et al. . |
| 4,121,610 | 10/1978 | Harms et al. . |
| 4,140,196 | 2/1979 | Brewer . |
| 4,183,419 | 1/1980 | Henn et al. . |
| 4,236,595 | 12/1980 | Beck et al. . |
| 4,241,577 | 12/1980 | Baldauf . |
| 4,244,184 | 1/1981 | Baldauf et al. . |
| 4,295,539 | 10/1981 | Beck et al. . |
| 4,554,991 | 11/1985 | Eden . |
| 4,766,727 | 8/1988 | Dull et al. . |

FOREIGN PATENT DOCUMENTS

2138527  1/1973  France ..................... 91/532

*Primary Examiner*—Hoang Nguyen
*Attorney, Agent, or Firm*—George Pappas

[57] ABSTRACT

A valve for controlling the flow of hydraulic fluid from a hydraulic pump to and back from a pair of hydraulic motors. The valve includes a selector spool for selectively energizing and de-energizing the motors. A pair of flow dividers each include a pair of flow divider spools which are slidingly longitudinally arranged. A pair of poppets, also longitudinally slidingly arranged, are located between the spools are selectively shifted in response to the hydraulic fluid flow and pressures within the motors. The spools and poppets longitudinally shift to equalize the pressure of the hydraulic fluid delivered to each motor and minimize loses. An override spool is selectively shiftable for bypassing the flow dividers and directly connecting the pump to the motors.

27 Claims, 4 Drawing Sheets

FIG. 1

FIG_2

FIG_4

FIG_3

FIG_5

FIG_6

FIG_7

FIG_8

FIG_9

FIG_10

FIG_11

FIG_12

FIG_13

FLUID CONTROL VALVE

TECHNICAL FIELD

The present invention relates to the technical field of fluid control valves used in controlling the flow of hydraulic fluid to hydraulic machinery such as hydraulic motors. More particularly, the present invention relates to a hydraulic fluid control valve for dividing and equalizing the pressure of the hydraulic fluid delivered to two hydraulic motors.

BACKGROUND OF THE INVENTION

Many vehicles such as a combines construction back hoes, road pavers, vibratory drum rollers, etc., are quite often driven with a main power source such as a hydraulic primary pump coupled with a combustion engine or directly with the combustion engine. Typically, one set of wheels are directly driven by the combustion engine or the hydraulic primary pump and the other set of wheels, typically the steerable wheels, are often equipped with hydraulic fluid motors for assisting in driving the vehicle. Accordingly, a four-wheel drive vehicle is provided for better performing in rough and slippery terrains such as muddy fields and construction sites.

The hydraulic fluid assist motors are typically used only when needed and, for that reason, a high pressure fluid valve is provided wherethrough the assist motors are selectively energized and de-energized. For example, the assist motors are energized when the vehicle is used in a construction or agricultural field, whereas they are de-energized when it is driven on paved surfaces, for example, from job site to job site.

A flow dividing valve is also typically provided in conjunction with or separate from the on/off valve. The flow dividing valve functions to regulate the flow of hydraulic fluid to the two assist motors and prevent the wheels driven by the assist motors from slipping. In this regard, the high pressure hydraulic fluid passes through the flow dividing valve to the assist motors and, thereafter, on the low pressure side the hydraulic fluid passes from the motors through flow divider valve and back to the hydraulic pump whereat the hydraulic fluid may again be increased in pressure and again delivered through the valve to the motors. Typically, the flow divider includes components for sensing the pressure of the hydraulic fluid being delivered to each of the assist motors and, in the event the pressure at one motor decreases, the components are adapted to shift in a manner whereby hydraulic fluid flow to the decreasing pressure side is decreased. This in turn increases hydraulic fluid flow to the other assist motor and thereby tends to equalize the pressure of the hydraulic fluid delivered to each of the assist motors. For example, in the event that a wheel driven by one assist motor experiences ice and slips, it will cause its assist motor to turn more rapidly and draw more hydraulic fluid. This translates to a hydraulic fluid pressure drop in that motor which in turn is sensed and corrected by the flow dividing valve.

Although on/off valves and flow dividing valves have been devised, manufactured and used extensively in the past, such valves have shortcomings and drawbacks. Flow dividing valves of the past have generally been costly to manufacture. More importantly, they experience substantial frictional losses in accomplishing their intended result and, therefore can be very inefficient. These frictional losses can also increase the temperature of the hydraulic fluid thereby requiring additional heat dissipating devices and otherwise affecting other system components.

Accordingly, a need exists for an on/off valve and flow dividing valve that can be manufactured relatively inexpensively and which accurately and efficiently divides the flow of hydraulic fluid to two hydraulic assist motors with relatively smaller frictional losses.

SUMMARY OF THE INVENTION

It is the principal object of the present invention to overcome the above-discussed disadvantages associated with prior hydraulic assist on/off valves and flow dividing valves.

The present invention overcomes the disadvantages associated with prior flow dividing valves by providing a set of flow dividers, each of which are connected to two separate hydraulic fluid motors and to the hydraulic pump supply and return fluid lines. Both of the flow dividers are essentially constructed the same and include a first passage connected to the hydraulic pump, a second passage connected to one of the hydraulic motors, and a third passage connected to the other or second hydraulic motors. In each of the flow dividers, between the second and third passages, a bore is provided through the valve housing whereat a set of flow divider spools are longitudinally slidingly received. Each of the flow divider spools are provided with an orifice at one end and a poppet bore at their other end communicating with the spool orifice. A poppet having an orifice extending therethrough is longitudinally slidingly received in each of flow divider spool poppet bores. Hydraulic fluid may, thus, travel in each of the flow dividers from their first passage through the spool bores, poppet orifices and spool orifices, and to each of the fluid divider second and third passages communicating with the hydraulic fluid motors.

A poppet compression spring is located between the poppets biasing them away from each other and toward and into their respective spool poppet bores. Compression spool springs are also provided at the ends of each of flow divider housing bores for biasing each of the spools thereat toward each other. The spools include a plurality of notches at their ends opposite the spool orifice so that hydraulic fluid may travel between the spool poppet bores and the first passage of each flow divider.

A plurality of holes are provided through each of the flow divider spools to allow additional hydraulic fluid flow between each of the flow divider first passages and into the flow divider spool poppet bores. Each of the poppers are longitudinally slidingly movable between a seated position against a poppet annular seat within the spool poppet bore and an unseated position. When the poppet is seated, the plurality of holes are at least in part blocked thereby requiring all hydraulic fluid flow to travel through the poppet orifice and into the spool poppet bore, and then through the spool orifice to each of the motors. When the poppet is unseated, hydraulic fluid may, at least in part, travel through the plurality of holes bypassing the poppet orifice and into the flow divider spool bores.

A second plurality of holes are also provided through each of the flow divider spools extending into the spool poppet bores at a location between the spool orifice and the poppet located therein. The second plurality of holes provide additional hydraulic fluid flow from between the flow dividers spool poppet bores and the respective second and third passages. Additionally, a spool seat is provided in each of the first and second flow divider second and third passages whereat the spools are selectively seated for preventing hydraulic fluid flow from between the spool poppet bores, through the second plurality of holes, to the second and third passages leading to the hydraulic motors.

When high pressure hydraulic fluid is delivered to the motor from the first passage through a flow divider, the flow divider spools and/or poppets shift longitudinally as needed for equalizing the pressure of the hydraulic fluid being delivered to each of the motors through the respective second and third passages. On the return side, the pressure drop over the flow dividers at each of the second and third passages pushes the flow divider spools and poppets toward each other, thereby unseating the spools from the spool seats and poppets from the poppet seats. Hydraulic fluid, thus, travels from each of the second and third passages through the spool orifice and second plurality of holes, into the spool bore, and out through the first plurality of holes and poppet orifice and spool notches into the flow divider first passage.

Selectively openable bypass passages are provided in each of the flow dividers between the first passages and second and third passages. An override spool is selectively shifted for opening and closing the bypass passages, thereby selectively directing flow between the first passage and the second and third passages and thereby allowing the hydraulic fluid to bypass the flow dividers and not travel through the flow divider spools and poppets. The valve also includes an on/off spool for selectively connecting and disconnecting the hydraulic pump to the first passages of each of the first and second flow dividers.

In one form thereof, the present invention is directed to a valve for controlling the flow of hydraulic fluid between a hydraulic fluid pump and two hydraulic motors. The valve includes a first flow divider having a first fluid passage communicating with a pump, a second fluid passage communicating with a first hydraulic motor and a third fluid passage communicating with a second hydraulic motor. A second flow divider is also provided having a first fluid passage communicating with the pump, a second fluid passage communicating with the first hydraulic motor and a third fluid passage communicating with the second hydraulic motor. The first flow divider includes a first spool and a first poppet between its first fluid passage and its second fluid passage and a second spool and a second poppet between its first fluid passage and its third fluid passage. The first flow divider first and second spool and first and second poppets are longitudinally arranged and movable with respect to one another. The second flow divider includes a first spool and a first poppet between its first fluid passage and its second fluid passage and a second spool and a second poppet between its first fluid passage and its third fluid passage. The second flow divider first and second spools and first and second poppets are longitudinally arranged and movable with respect to one another. The first flow divider spools and poppets and second flow divider spools and poppets are longitudinally movable for equalizing the pressure of the hydraulic fluid being delivered to each of the motors.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DESCRIPTION OF THE PREFERRED EMBODIMENTS

Figure 1:
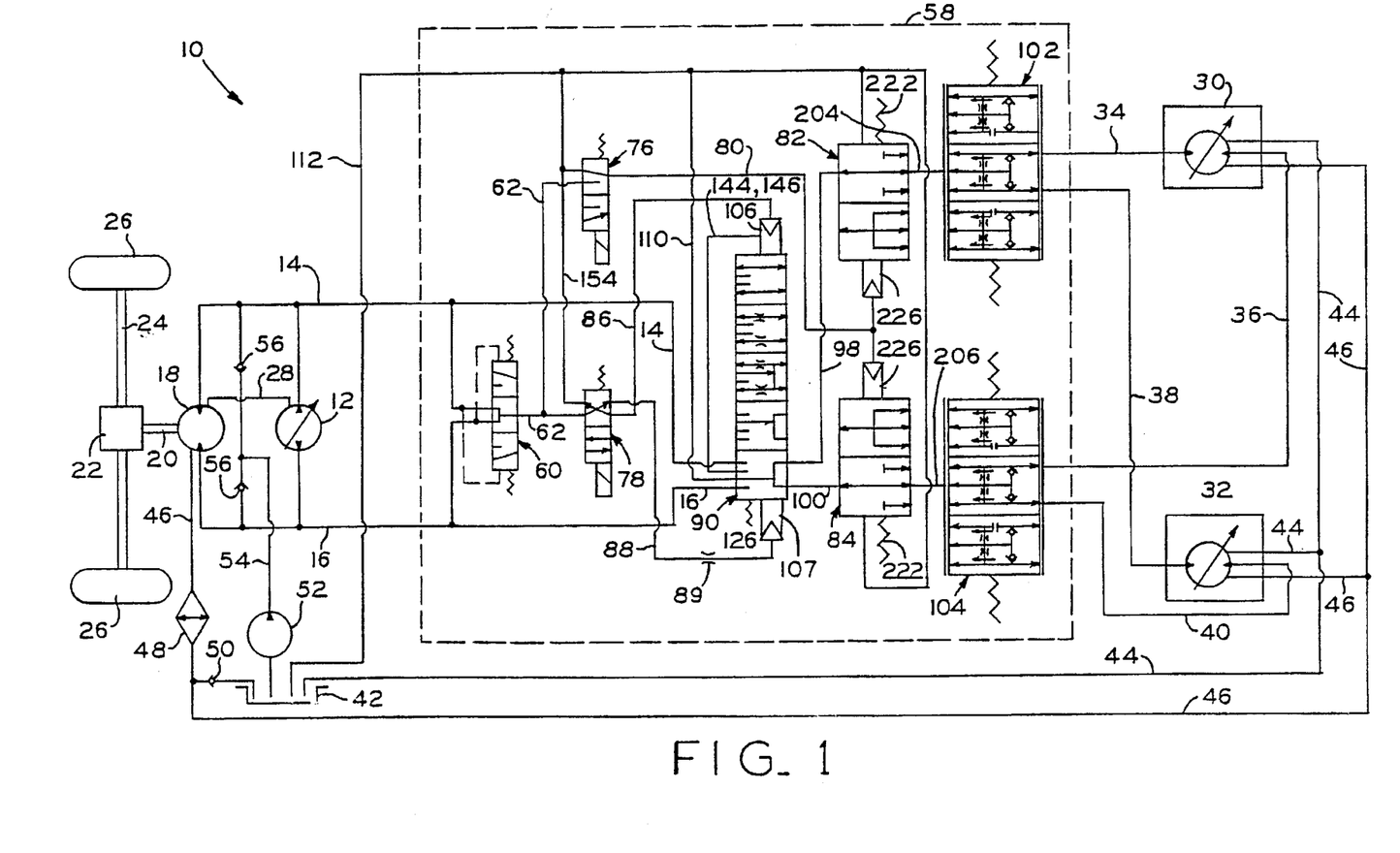
FIG. 1 is a schematic diagram showing a hydrostatic system of a vehicle incorporating a valve constructed in accordance with the principles of the present invention.

Referring initially to FIG. 1, there is schematically shown and generally designated by the numeral 10 a hydraulic drive system for a vehicle such as a combine and which incorporates the present invention. Hydraulic drive system 10 includes a primary hydraulic pump 12 capable of pumping hydraulic fluid or oil at a pressure of approximately 6,000 PSI. Pump 12 can be operated in a forward or reverse direction thereby selectively providing high or drive supply pressure to either of fluid lines 14 or 16 while the other fluid line 14 or 16 functions as the low pressure return fluid line. Supply and return fluid lines 14 and 16 are connected to primary hydraulic motor 18 which is coupled through shaft 20, gear train 22 and primary axle 24 to primary driven wheels 26. Fluid line 28 is connected between pump 12 and motor 18 and is provided for the purpose of connecting motor 18 and the pump case drains through fluid line 46 and heat exchanger 48 to reservoir 42.

Accordingly, the primary driven wheels 26 can be driven in a forward or reverse direction by selectively switching primary pump 12 between its forward and reverse flow directions. It is noted that primary hydraulic pump 12 is driven by a combustion engine (not shown) and that, alternatively, the combustion engine can be adapted to directly drive primary wheels 26 in a known and customary manner without the use of a primary hydraulic motor 18.

Hydraulic drive system 10 further includes hydraulic fluid secondary or assist motors 30 and 32 in driving engagement with secondary driven wheels, typically the steering wheels of a combine (not shown). Motors 30 and 32 are preferably of the cam lobe type and are located close to or in the hubs of the secondary or assist driven wheels. As can be appreciated, secondary hydraulic motors 30 and 32 make the vehicle a four-wheel type and are provided to assist in driving the vehicle, especially in rough and slippery terrain such as muddy fields and construction sites. High pressure fluid is supplied to secondary hydraulic motor 30 via either fluid line 34 or fluid line 36 and, depending on which of those fluid lines is provided with the high pressure hydraulic fluid, motor 30 is driven in either a forward or reverse direction. Similarly, secondary hydraulic motor 32 is provided with high pressure hydraulic fluid through either fluid line 38 or fluid line 40 and, depending on which of those fluid lines is providing the high pressure fluid, hydraulic motor 32 is driven in either a forward or reverse direction. Each of secondary hydraulic motors 30 and 32 are connected to the drain or reservoir 42 via fluid lines 44. Additionally, fluid line 46 is provided connecting both of secondary hydraulic motors 30 and 32 and, through heat exchanger 48, also connecting primary hydraulic motor 18. Fluid line 46 is connected to reservoir 42 through the one way or check valve 50. Fluid line 46, heat exchanger 48 and check valve 50 function to supply cool oil or hydraulic fluid to motors 30 and 32 by removing heat from the hydraulic fluid.

A charge pressure pump 52 is provided and draws fluid from reservoir 42 and delivers charge pressure of approximately 150 to 500 PSI through fluid line 54 and through either of the one way or check valves 56 to the low pressure or return line of primary pump 12. Thus, depending of the flow direction of primary pump 12, one of fluid lines 14 or 16 is provided with high pressure hydraulic fluid typically in the neighborhood of 6,000 PSI, while the other of the two fluid lines 14 or 16 is provided with charge pressure hydraulic fluid, typically in the neighborhood of 150 to 500 PSI.

A preferred embodiment of a control valve is indicated within dash line 58 and incorporates the present invention. Control valve 58 is provided for selectively energizing and de-energizing secondary hydraulic motors 30 and 32 and for selectively distributing more or less high pressure fluid to each of those motors depending on the slip condition or need of each of those hydraulic motors. Control valve 58 also first provides charge pressure to motors 30 and 32 prior to delivery of the high pressure hydraulic fluid regardless of whether those motors are in a forward or reverse mode. In this manner, the pressure delivered to secondary or assist motors 30 and 32 is introduced gradually for first placing all of the motor components in pressure contact with one another and, thereby, decreasing the impact of high pressure fluid and potential harm to the various components thereof.

Figure 2:
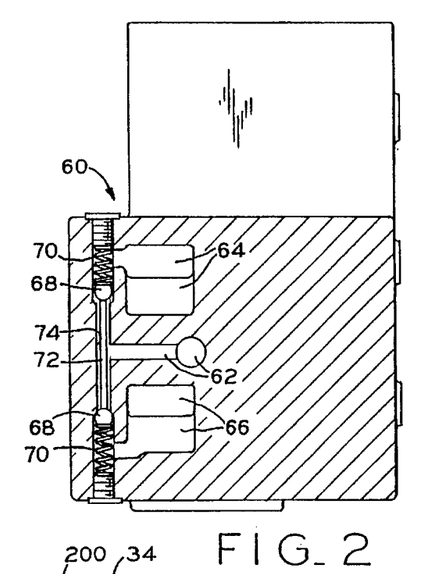
FIG. 2 is a cross sectional view of a low pressure shuttle valve incorporated in the valve shown in FIG. 1.

Control valve 58 includes a low pressure shuttle valve 60 schematically shown in FIG. 1 and also shown in FIG. 2. Low pressure shuttle valve 60 is connected to fluid lines 14 and 16 and functions to connect either of those lines which is carrying the charge pressure to a fluid line 62. More specifically, as more clearly shown in FIG. 2, shuttle valve 60 includes two shuttle valve inputs 64 and 66 connected to fluid lines 14 and 16 (not shown in FIG. 2). Two balls 68 are biased toward their sealing position with springs 70. A rod 72 is located between balls 68 and within fluid passage 74 having a greater diameter than that rod 72. Fluid passage 74, is connected to fluid line 62. Further, rod 74 has a longitudinal length longer than the longitudinal length of fluid passage 74 such that only one of balls 68 can be seated at any particular time, while the other ball remains unseated for allowing fluid flow from either shuttle valve input 64 or 66 into fluid passage 74 and out to fluid line 62. Accordingly, the higher of the two pressures provided in either of the shuttle inputs 64 or 66 causes its respective ball 68 to be seated, thereby creating a seal and preventing high pressure fluid from entering fluid passage 74. Simultaneously, rod 72 pushes the other ball 68 away from its seating position thereby allowing the low charge pressure hydraulic fluid to enter fluid passage 74 and exit through fluid line 62. As can be appreciated, high pressure hydraulic fluid within either of line 14 and 16 is, thus, prevented from entering fluid line 62 and instead, only charge pressure provided within either of lines 14 or 16 is allowed to travel through low pressure shuttle valve 60 and into fluid line 62.

Charge pressure fluid line 62 is connected to and provides charge pressure to override spool solenoid control valve 76 and to on off selector spool solenoid control valve 78. Solenoid control valve 76 selectively provides charge pressure to fluid line 80 for controlling the position of override spools 82 and 84. Solenoid control valve 78 selectively provides charge pressure to fluid lines 86 and 88 for selectively controlling the position of selector spool 90. Solenoid control valves 76 and 78 are controlled from a remote location such as the cab of a combine by merely providing the necessary electrical circuit connection for energizing or de-energizing the respective solenoid in a known and customary manner.

Figure 3:
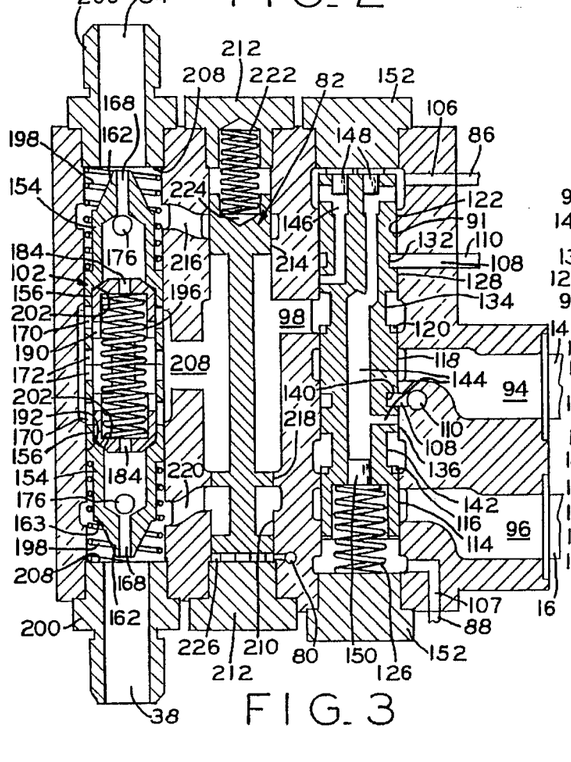
FIG. 3 is a cross sectional view of the valve shown in FIG. 1 and showing the on/off selector spool, one of the override spools and one flow divider.
Figure 4:
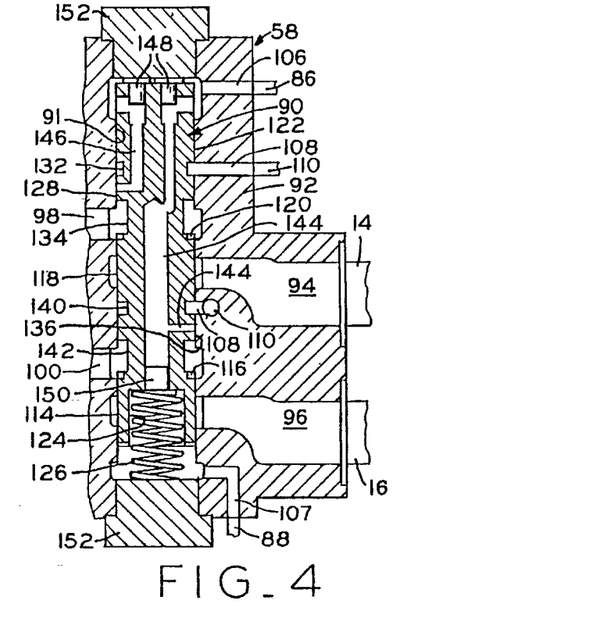
FIG. 4 is a cross sectional view of the selector spool shown in FIG. 3 and showing the passages leading to each of the flow dividers and, further, showing the spool in the closed or off position.

Referring now to FIG. 4, selector spool 90 is located within a bore 91 in the housing 92 of control valve 58. Fluid line 14 is connected to inlet port 94 and fluid line 16 is connected to inlet port 96. Selector spool 90, in general, is a two position six way spool and is provided for selectively connecting together line 14 and inlet port 94 to fluid passage or line 98 and simultaneously connecting line 16 and inlet port 96 to fluid passage or line 100. It should be noted that in FIGS. 4–9, fluid passages 98 and 100 are shown as if they are located in the same cross sectional plane. However, as best seen in FIGS. 2, 3, 10 and 11, fluid passages 98 and 100 are in different planes or are radially set apart from selector spool 90 so that fluid passage 98 is connected to and communicates with override spool 82 and flow divider 102, whereas fluid passage 100 is connected to and communicates with override spool 84 and flow divider 104. Valve housing 92 is also provided with a charge pressure port 106 diagrammatically shown and connected to charge pressure fluid line 86. Charge pressure port 107 is also provided and diagrammatically shown and is connected to charge pressure fluid line 88. Additionally, drain ports 108 are diagrammatically shown through housing 92 and are connected via fluid lines 110 and 112 to reservoir 42.

Figure 12:
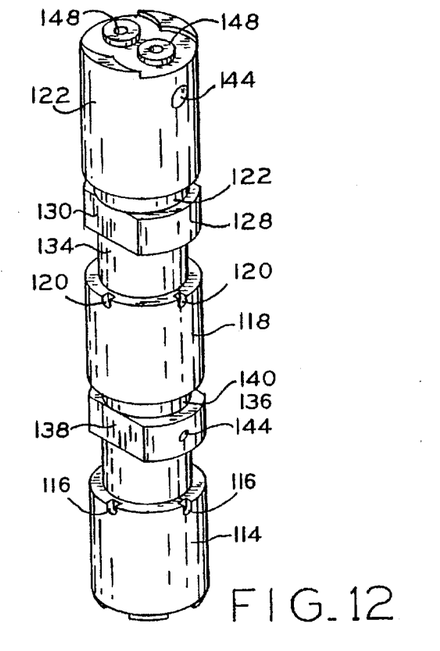
FIG. 12 is a perspective view of the selector spool constructed in accordance with the principles of the present invention; and, FIG. 13 is a perspective exploded view of a flow divider spool and poppet constructed in accordance with the principles of the present invention.

Referring now more particularly to FIG. 12, selector spool 90 is provided with a lower land or surface 114 with a plurality of metering slots 116, a central land or surface 118 also with a plurality of metering slots 120 and an upper land or surface 122. A bore 124 is provided at the lower end of spool 90 which is adapted to receive a spring 126 for biasing spool 90 upwardly in the position shown in FIG. 4. Upper partial lands 128 and flats 130 are located between upper land 122 and central land 118. Additionally, passage reduction area 132 is located between upper land 122 and upper partial flats 128 and passage reduction area 134 is located between upper partial flats 128 and central land 118. At the lower end of spool 90, there are also provided lower partial lands 136 and flats 138 inbetween central land 118 and lower land 114. A passage reduction area 140 is also located between central land 118 and partial lower lands 136 and yet another passage reduction area 142 is located between lower partial lands 136 and lower land 114.

Spool 90 is further provided with a first charge pressure inner passage 144 extending and providing communication between upper land 122 and lower partial land 136. A second charge pressure inner passage 146 is also provided through spool 90 extending and providing communication between upper land 122 and upper partial land 128. Plugs 148 are provided for sealing passages 144 and 146 after the necessary machining and drilling operations. Plug 150 serves to seal off inner passage 144 at its lowermost end after the drilling and machining operations. Finally, plugs 152 are provided and serve to seal off the selector spool receiving bore 91 as shown.

Selector spool 90 is shown in FIGS. 1 and 4 in the off position during which both fluid passages 98 and 100 are connected with fluid line 110 leading to reservoir 42. More specifically, fluid passage 98 communicates with passage reduction 134 along with passage reduction 132 over flats 130, and passage reduction 132 communicates with fluid line 110 through drain port 108. Similarly, fluid passage 100 communicates with passage reduction 142 and passage reduction 140 over flats 138, and passage reduction 140 also communicates with fluid line 110 through a drain port 108. In this position, with the on/off selector spool solenoid 78 de-energized, any hydraulic fluid pressure within motors 30 and 32 or in the override spools and flow dividers is relieved and drained to reservoir 42. So long as the selector spool solenoid valve 78 remains in the de-energized position shown, charge pressure in line 88 along with spring 126 push the spool 90 upwardly in the position shown in FIG. 4. In this position, fluid line 86 is also connected to reservoir 42 through fluid lines 154 and 112 and, therefore, no counter forces are provided to spring 126 and the charge pressure of fluid line 88. Additionally, both lines 14 and 16 are totally blocked by spool 90 thereby disconnecting them from motors 30 and 32.

For placing spool 90 in its on position, solenoid control valve 78 is energized thereby placing charge pressure from fluid line 62 to fluid line 86 and connecting fluid line 88 through fluid lines 154 and 112 to reservoir 42. Thus, charge pressure is provided at charge pressure port 106, whereas no pressure is provided at charge pressure port 107. The charge pressure at port 106 creates the necessary force and, acting against spring 126, starts to shift the selector spool 90 downwardly. A metering orifice 89 can be provided for controlling the shift rate of selector spool 90.

Figure 5:
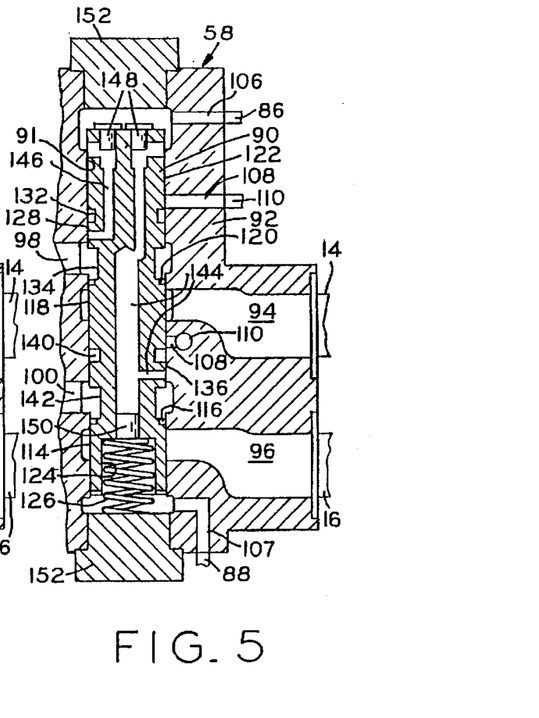
FIG. 5 is a cross sectional view similar to FIG. 4 but wherein the selector spool is partially shifted downwardly closing the fluid passages to the drain or reservoir.

As best seen in FIG. 5, as selector spool 90 shifts downwardly, initially, central land 118 and upper land 122 slide over and close drain ports 108 communicating with fluid line 110. All other connections between the various fluid lines and passages remain the same. It is noted that the position of FIG. 5 is not depicted in the schematic diagram of spool 90 in FIG. 1.

Figures 6, 7, 8, 9:
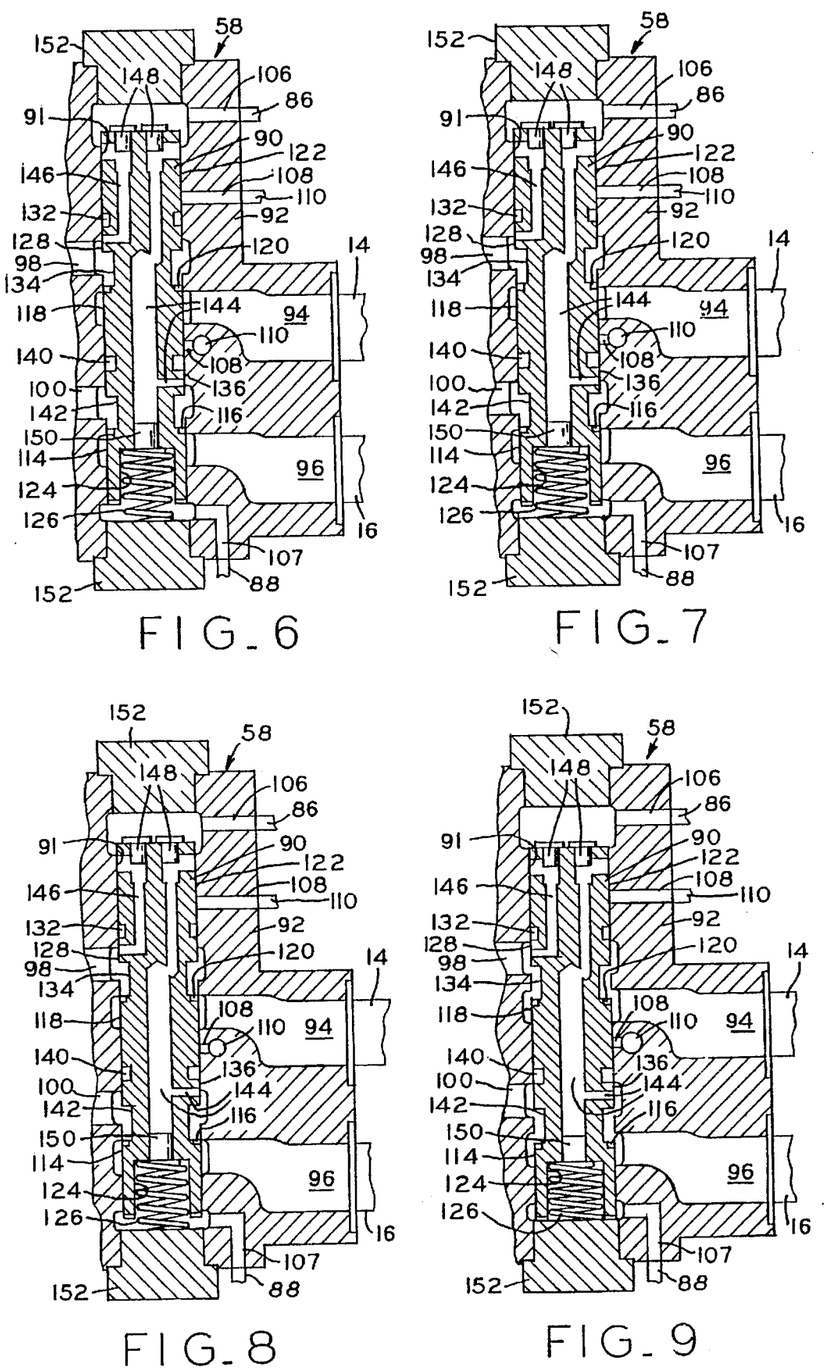
FIG. 6 is a cross sectional view similar to FIG. 5 but showing the selector spool shifted further downwardly for connecting and providing charge pressure through each of flow dividers to each of the hydraulic motors.
FIG. 7 is a cross sectional view similar to FIG. 6 but showing the selector spool shifted yet further downwardly in a position during which the hydraulic pump fluid lines are each connected to the hydraulic motors through metering slots and charge pressure continues to be provided to the hydraulic motors.
FIG. 8 is a cross sectional view similar to FIG. 7 but wherein the selector spool has shifted yet further downwardly closing the charge pressure passages.
FIG. 9 is a cross sectional view similar to FIG. 8 but wherein the selector spool has been totally shifted to the on position and the fluid lines or passages from the hydraulic motors are fully connected to the hydraulic motors through the flow dividers.

Continued movement of spool 90 downwardly places it in the position shown in FIG. 6 and in the second depicted position from the bottom of the schematic in FIG. 1. In this position, fluid line 86 and charge pressure port 106 which are at charge pressure are placed in communication with both fluid passages 98 and 100. More specifically, charge pressure port 106 communicates with fluid passage 98 through second charge pressure inner passage 148, whereas fluid passage 100 communicates with charge pressure port 106 through first charge pressure inner passage 144. Accordingly, charge pressure is provided through the override valve section with spools 82 and 84 and the flow dividers 102 and 104 to motors 30 and 32 for initializing and placing the various components thereof in contact with one another.

Continued downward shifting of spool 90 places it in the position shown in FIG. 7 and in the third schematic depicted position from the bottom in FIG. 1. Here, charge pressure continues to be delivered to both fluid passages 98 and 100 from charge pressure port 106 through pressure inner passages 146 and 144 respectively. Additionally, however, metering slots 116 start to provide minimal communication between fluid passage 16 and inlet port 96 with fluid passage 100 while metering slots 120 start to provide minimal communication between fluid line 14 and inlet port 94 with fluid passage 98. In this position, the pressure within fluid passages 98 and 100 begins to rise up to and possibly slightly over the charge pressure.

Prior to the high pressure hydraulic fluid being able to travel backwardly through the charge pressure port 106 and fluid line 86, charge pressure inner passages 144 and 146 are sealed from the high pressure hydraulic fluid as shown FIG. 8. As shown schematically in the fourth depicted diagram from the bottom in the spool 90 of FIG. 1 and in FIG. 8, when spool 90 has shifted just beyond the position of FIG. 7, the charge pressure inner passages 144 and 146 are closed at their upper ends by upper land 122. Thus, metering slots 116 and 120 continue to gradually allow hydraulic fluid flow at their respective locations for further increasing the hydraulic pressure at fluid passages 98 and 100.

In its final position as shown in FIG. 9, spool 90 is shifted in its lowermost position. This is schematically shown in the uppermost block from the bottom in spool 90 shown in FIG. 1. Here, fluid line 14 and inlet port 94 are in full fluid communication with passage 98 over passage reduction 134. Additionally, fluid line 16 and inlet passage 96 are in full fluid communication with passage 100 over passage reduction 142. In this position, all other passages, ports and fluid lines are sealed off and maximum flow is provided from primary pump 12 to motors 30 and 32 and back to primary pump 12. In this regard, it is noted that, depending on the forward or reverse pumping direction of primary pump 12, one of ports 94 or 96 will be supplying high pressure fluid, whereas the other of the ports 94 or 96 will be returning the low pressure fluid.

Figure 10:
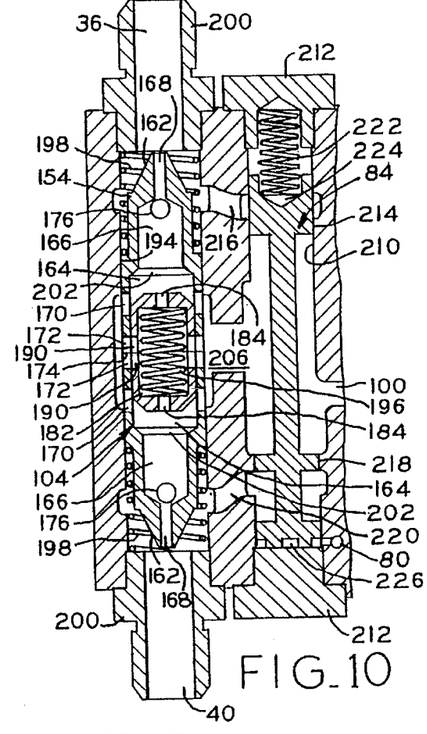
FIG. 10 is a cross sectional view of the flow divider and override spool shown in FIG. 3 but wherein the flow divider poppets are shifted toward each other.
Figure 13:
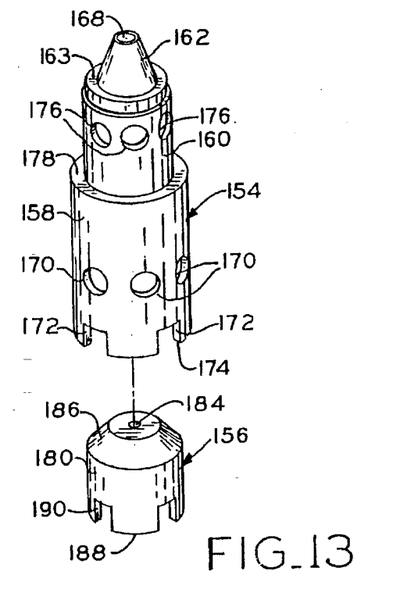

Referring now more specifically to FIGS. 3, 10 and 13, flow dividers 102 and 104 will more fully be described. Each of the flow dividers 102 and 104 include a pair of flow divider spools 154 and a pair flow divider poppets 156. Flow divider spools 154, as best seen in FIG. 13, include a lower land or surface 158, a reduced diameter section 160 and a frusto conical portion 162. A larger bore 164 extends coaxially through the lower land area 158 and communicates with a smaller bore 166 located coaxially in the reduced diameter section 160. A flow divider orifice 168 is provided through the frusto conical portion 162 and communicates with the smaller bore 166. A plurality of holes 170 extend through the lower land 158 and communicate with the larger bore 164. A plurality of notches 172 are provided at the lower most annular surface 174 thereby providing additional communication from the outside to larger bore 164 of lower land 158. A plurality of holes 176 are provided through the reduced diameter section 160 and communicate with the smaller bore 166. An annular spring seat 178 is located between lower land 158 and reduced diameter section 160.

Each of the flow dividers 102 and 104 are also provided with a pair of flow divider poppets 156. As best seen in FIG. 13, poppets 156 include an outer land or surface 180 having a diameter slightly smaller than the larger bore 164 of flow divider spools 154 so that poppets 156 may be longitudinally slidingly received within larger bore 164. Each poppet 156 includes a spring receiving bore 182 located coaxially with outer land 180 and communicating with a popper orifice 184 extending through the poppet upper annular section 186. At the lower annular surface 188 of each poppet 156, a plurality of notches 190 are provided through outer land 180 and for providing communication to the spring receiving bore 182.

Figure 11:
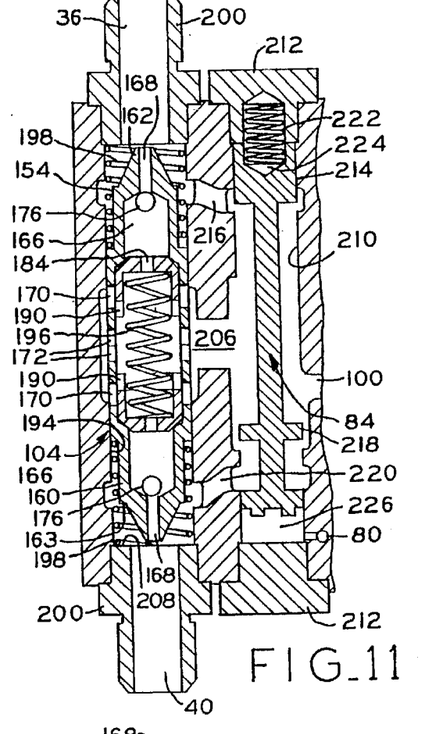
FIG. 11 is a cross sectional view of the second flow divider and second spool constructed in accordance with the principles of the present invention.

Referring now more particularly FIGS. 3, 10 and 11, a pair of flow divider spools 154 and a pair of poppets 156 are longitudinally slightly received within the flow divider valve housing bore 192 of flow divider 102 (FIG. 3) and, also, in the flow divider valve housing bore 194 of flow divider 104 (FIG. 10). As shown, in each of flow dividers 102 and 104, the spools 154 and poppets 156 are received within their respective housing bores 192 and 194 with their respective spool annular surfaces 174 and poppet annular surfaces 188 longitudinally facing each other.

A poppet spring 196 is received in each of respective flow divider valve housing bores 192 and 194 within opposing poppet spring receiving bores 182. Poppet spring 196 is a compression spring and urges the opposing poppets 156 and flow divider spools 154 away from each other and toward flow divider spool springs 198 or the openings of the valve housing bores 192 and 194. Flow divider spool springs 198 are also compression springs and extend between couplings 200 and annular spring seats 178 of flow divider spools 154. As shown, reduced diameter sections 160 and frusto conical portions 162 of each of the flow divider spools 154 are coaxially received, at least in part, within flow divider spool springs 198. The strength of flow divider spool springs 198 is greater than that of poppet springs 196 so that, without any hydraulic oil or fluid passing therethrough, the flow divider spools are longitudinally pushed toward one another with their respective annular surfaces 174 in contact with one another. Additionally, flow divider poppets 156 are urged away from each other with their respective upper annular sections 186 in contact with frusto conical surfaces or seats 202 located between larger bores 164 and smaller bores 166.

Referring now also to FIG. 1, fluid passage 98 extends from selector spool 90 to override spool 82 which in turn is connected to flow divider 102 through fluid passage 204. Flow divider 102 is then connected at one coupling 200 through fluid line 34 to hydraulic motor 30 and through the other coupling 200 and fluid line 38 to the other hydraulic motor 32 (see also FIG. 3). Additionally, fluid passage 100 is connected from selector spool 90 to override spool 84 which is turn connected to flow divider 104 via fluid passage 206, and flow divider 104 is connected to hydraulic motor 30 through a coupling 200 and fluid line 36 and to hydraulic motor 32 through a coupling 200 and fluid line 40 (See also FIG. 10).

In operation, assuming selector spool 90 has been shifted to its on position and high pressure fluid or oil is provided in fluid line 14, the high pressure is transmitted through fluid passage 98, override spool 82 and to fluid passage 204 leading into flow divider 102 (FIG. 3) whereas, the low pressure hydraulic fluid or oil returning from the hydraulic motors comes back through flow divider 104, fluid passage 206, override spool 84 and fluid passage 100 (FIG. 10) and finally back to low pressure fluid line 16. So long as the pressure and, thus, flow in each of fluid lines 34 and 38 remains constant, high pressure fluid in passage 204 travels through the respective notches 172 and holes 170 of opposing spools 154, through the orifices 184 of opposing poppets 156 to within the smaller bores 166 of flow divider spools 154, and then out through holes 176 and flow divider orifices 168 to the respective now high pressure fluid lines 34 and 38.

Flow dividers 102 and 104 function to provide maximum pressure and flow to the hydraulic motor experiencing the greatest resistance while decreasing the pressure and flow to the motor experiencing the least resistance. For example, referring again to FIG. 1, if the wheel being driven by hydraulic motor 30 begins to slip, motor 30 will demand more fluid through line 34, thereby increasing flow thereto but decreasing pressure. This decreasing pressure in fluid line 34 causes spool 154 which is providing fluid to line 34 to shift closer toward coupling 200 and possibly cause the frusto conical portion 162 or annular seat 163 of spools 154 to be seated against the coupling annular seat 208. Thus, fluid is prevented from traveling through holes 176 to fluid line 34. Rather, only a smaller quantity of fluid is allowed to pass through the flow divider orifice 168 and into fluid line 34. This in turn effectively increases the pressure in fluid line 38 thereby increasing flow to hydraulic motor 32.

In the above described example, low pressure hydraulic fluid leaving motors 30 and 32 through fluid lines 36 and 40 is directed to flow divider valve 104 as shown in FIG. 10. Here, low pressure hydraulic fluid travels from fluid lines 36 and 40, through flow divider spool orifices 168 and holes 170 into smaller bores 166, into larger bores 164 through poppet orifices 184 and out through poppet notches 190 and flow divider spool notches 172 to fluid passage 206. The pressure within fluid lines 36 and 40 tends to keep the respective flow divider spools 154 together with their respective annular surfaces 174 in contact with one another. Additionally, the pressure of the flowing fluid within the flow divider spools smaller bores 166 causes the respective opposing poppets 156 to compress poppet springs 196 as shown in FIG. 10 moving the poppets 156 longitudinal closer to one another. This places the smaller and larger bores 166 and 164 of spools 154 in direct communication with fluid passage 206 through spool holes 170 and, thereby, allowing fluid flow therethrough bypassing poppet orifices 184. As can be appreciated, this decreases resistance thereby increasing efficiency. It is also noted that when uneven pressure or flows are experienced, for example, as described hereinabove with respect to a wheel slipping, flow divider spools 154 and/or poppets 156 tend to shift as needed for maximizing fluid flow, balancing the pressures and causing even flow from fluid lines 36 and 40 to fluid passage 206. In the example described hereinabove where the wheel of hydraulic motor 30 experiences slip, a greater amount of fluid flow or pressure will be experienced in fluid line 40 since additional pressure and flow was delivered to hydraulic motor 32. This will in turn cause the flow divider spools 156 and or poppets of flow divider 104 to shift toward the coupling 200 of fluid line 36, thereby accommodating the additional pressure and fluid flow at fluid line 40.

On occasion, it is desirable to bypass the operation of flow dividers 102 and 104 and simply provide maximum flow and pressure to hydraulic motors 30 and 32. In this regard, override spools 82 and 84 are provided in override spool housing bores 210 longitudinally inbetween plugs 212. Override spools 82 and 84 each include an upper land 214 associated with fluid passage 216 and adapted for selectively connecting and disconnecting fluid lines 34 and 36 through fluid passages 216 to fluid passages 100 or 98 and 206 or 204. Override spools 82 and 84 also include a lower land 218 associated with fluid passages 220 for selectively opening and closing communication between fluid lines 38 and 40 through fluid passage 220 and to passages 206 or 204 and 100 or 98. An override spool spring 222 is provided for each override spool 82 and 84 between upper land 214 and upper plug 212 and is at least partially received within override spool bore 224. Springs 222 are compression springs and urge override spools 82 and 84 downwardly in their closed position as shown in FIGS. 3 and 10. In the position shown in FIGS. 3 and 10, override spools 82 and 84 prevent fluid flow through passages 216 and 220.

For shifting override spools 82 and 84, solenoid control valve 76 is energized, thereby placing charge pressure in fluid line 80 which is connected to the lower end of override spools 82 and 84. Charge pressure in fluid line 80 and within area 226 creates an upward force against override spool compression spring 222 and, thereby, shifting the override spools upwardly as shown in FIG. 11. With the override spools in this position, a path of least resistance is created through passages 216 and 220 bypassing flow dividers 102 and 104. More specifically, again assuming high pressure fluid is provided in fluid line 14 and is returning at fluid line 16 and selector spool 90 is in its fully shifted on position, the high pressure fluid in passage 98 is caused to at least in part bypass flow divider 102. That is, assuming override spool 82 is shifted upwardly in FIG. 3, the high pressure hydraulic fluid will flow from fluid passage 98 through fluid passage 216 around frusto conical portion 162 to fluid line 34 and will also flow through passage 220 to fluid line 38. It is noted that, although most of the flow will occur through passages 216 and 220, some flow will also occur through the flow divider 102.

Upon return from motors 30 and 32 through fluid lines 36 and 40, as shown in FIG. 11, the low pressure hydraulic fluid will then, in large part, bypass flow divider 104. That is, low pressure fluid in fluid line 36 travels through fluid passage 216 and directly to passage 100 while low pressure hydraulic fluid in line 40 travels through fluid passage 220 directly to fluid passage 100. Similar to the high pressure side, it is again noted that at least some hydraulic fluid will also travel through override spool 104 through fluid passage 206 and to fluid passage 100. Nevertheless, as should now be appreciated, by shifting override spools 82 and 84 to their on position, overall flow to hydraulic motors 30 and 32 is increased while the resistance and pressure drop created in the valve is decreased. This is especially helpful when it is desired to travel at the vehicle maximum speed and flow division between the motors 30 and 32 is not needed.

By de-energizing the override spool solenoid control valve 76 fluid line 80 is connected to line 112 and reservoir 42, thereby relieving the pressure within area 226 and allowing override spool springs 222 to push the override spools 82 and 84 to their closed position as shown in FIG. 3.

While the invention has been described as having specific embodiments, it will be understood that it is capable of further modifications. This application is, therefore, intended to cover any variations, uses, or adaptations, of the invention following the general principles thereof and including such departures from the present disclosure as come within known or customary practice in the art to which this invention pertains and fall within the limits of the appended claims.

What is claimed is:

1. A valve for controlling the flow of hydraulic fluid between a hydraulic fluid pump and two hydraulic motors, said valve comprising:

a first flow divider having a first fluid passage communicating with a pump, a second fluid passage communicating with a first hydraulic motor and a third fluid passage communicating with a second hydraulic motor;

a second flow divider having a first fluid passage communicating with said pump, a second fluid passage communicating with the first hydraulic motor and a third fluid passage communicating with the second hydraulic motor;

said first flow divider including a first spool and a first poppet between its first fluid passage and its second fluid passage and a second spool and a second poppet between its first fluid passage and its third fluid passage, said first flow divider first and second spools and said first and second poppets being longitudinally arranged and movable with respect to one another;

said second flow divider including a first spool and a first poppet between its first fluid passage and its second fluid passage and a second spool and second poppet between its first fluid passage and its third fluid passage, said second flow divider first and second spools and first and second poppets being longitudinally arranged and movable with respect to one another; and, wherein said first flow divider spools and poppets or said second flow divider spools and poppets are longitudinally movable for equalizing the pressure of the hydraulic fluid being delivered to each of the motors.

2. The valve of claim 1, wherein said first flow divider poppets are longitudinally arranged between said first flow divider spools and said second flow divider poppets are longitudinally arranged between said second flow dividers spools.

3. The valve of claim 2 further comprising:

a first flow divider poppet spring between said first flow divider poppets biasing said first flow divider poppets away from each other, and first flow divider spool springs biasing said first flow divider spools toward each other; and, a second flow divider poppet spring between said second flow divider poppets biasing said second flow divider poppets away from each other, and second flow divider spool springs biasing said second flow divider spools toward each other.

4. The valve of claim 3, wherein said first and second flow divider spools each include an orifice at one end and a poppet bore at their other end communicating with said spool orifice, each of said spools slidingly receiving one of said poppets in said poppet bores, and wherein each of said poppets include a poppet orifice, whereby hydraulic fluid may pass between said first and second flow divider respective first passages, poppet orifices, spool bores, spool orifices and said second and third passages of said first and second flow dividers.

5. The valve of claim 4, wherein each of said first and second flow divider spools include a first hole extending through and communicating with said spool bore, said poppets being selectively longitudinally movable for at least in part opening said first hole when hydraulic fluid is passing from said flow divider second or third passages to said first passage and at least in part blocking said first hole when hydraulic fluid is passing from said flow divider first passage to said second or third passages.

6. The valve of claim 5, further comprising an annular poppet seat in each of said spool bores between said first hole and spool orifice, whereat said poppet is selectively seated for preventing hydraulic fluid flow between said first hole to said spool orifice without first passing through said poppet orifice.

7. The valve of claim 6, further comprising a second hole in each of said first and second flow divider spools extending through and communicating with said spool bore and located between said spool orifice and said poppet seat.

8. The valve of claim 7, further comprising a spool seat in each of said second and third passages of said first and second flow dividers, whereat respective said spools may selectively be seated for preventing hydraulic fluid flow between said spool bores through said second hole to said second or third passages without passing through said spool orifice.

9. The valve of claim 8, further comprising selectively openable bypass passages in each of said first and second flow dividers between said first passages and said second and third passages, whereby hydraulic fluid is selectively passed directly between said first passage and said second and third passages without having to pass through said spools and poppets.

10. The valve of claim 9, further comprising an override spool for selectively opening and closing said bypass passages.

11. The valve of claim 10, further comprising an on/off spool for selectively connecting and disconnecting the hydraulic pump to said first and second flow divider first passages.

12. The valve of claim 11, further comprising a notch in each of said first and second flow divider spools on the end opposite said spool orifice wherethrough hydraulic fluid may pass when said spools and said first or second flow dividers are longitudinally adjacent one another.

13. The valve of claim 12, further comprising a notch in each of said first and second flow divider poppets on an end opposite said poppet orifice wherethrough hydraulic fluid may pass when said poppets and said first or second flow dividers are longitudinally adjacent one another.

14. The valve of claim 2, wherein said first and second flow divider spools each include an orifice at one end and a poppet bore at their other end communicating with said spool orifice, each of said spools slidingly receiving one of said poppets in said poppet bores, and wherein each of said poppets include a poppet orifice, whereby hydraulic fluid may pass between said first and second flow divider respective first passages, poppet orifices, spool bores, spool orifices and said second and third passages of said first and second flow dividers.

15. The valve of claim 1, further comprising:
  a first flow divider poppet spring between said first flow divider poppets biasing said first flow divider poppets away from each other, and first flow divider spool springs biasing said first flow divider spools toward each other; and,
  a second flow divider poppet spring between said second flow divider poppets biasing said second flow divider poppets away from each other, and second flow divider spool springs biasing said second flow divider spools toward each other.

16. The valve of claim 1, wherein said first and second flow divider spools each include an orifice at one end and a poppet bore at their other end communicating with said spool orifice, each of said spools slidingly receiving one of said poppets in said poppet bores, and wherein each of said poppets include a poppet orifice, whereby hydraulic fluid may pass between said first and second flow divider respective first passages, poppet orifices, spool bores, spool orifices and said second and third passages of said first and second flow dividers.

17. The valve of claim 16, wherein each of said first and second flow divider spools includes a first hole extending through and communicating with said spool bore, said poppets being selectively longitudinally movable for at least in part opening said first hole when hydraulic fluid is passing from said flow divider second or third passages to said first passage and at least in part blocking said first hole when hydraulic fluid is passing from said flow divider first passage to said second or third passages.

18. The valve of claim 17, further comprising an annular poppet seat in each of said spool bores between said first hole and spool orifice, whereat said poppet is selectively seated for preventing hydraulic fluid flow between said first hole to said spool orifice without first passing through said poppet orifice.

19. The valve of claim 18, further comprising a second hole in each of said first and second flow divider spools extending through and communicating with said spool bore and located between said spool orifice and said poppet seat.

20. The valve of claim 19, further comprising a spool seat in each of said second and third passages of said first and second flow dividers, whereat, respective said spools may selectively be seated for preventing hydraulic fluid flow between said spool bores through said second hole to said second or third passages without passing through said spool orifice.

21. The valve of claim 20, further comprising a notch in each of said first and second flow divider spools on the end opposite said spool orifice wherethrough hydraulic fluid may pass when said spools and said first or second flow dividers are longitudinally adjacent one another.

22. The valve of claim 20, further comprising a notch in each of said first and second flow divider poppets on an end opposite said poppet orifice wherethrough hydraulic fluid may pass when said poppets and said first or second flow dividers are longitudinally adjacent one another.

23. The valve of claim 1, wherein each of said first and second flow divider spools include a first hole extending through and communicating with said spool bore, said poppets being selectively longitudinally movable for at least in part opening said first hole when hydraulic fluid is passing from said flow divider second or third passages to said first passage and at least in part blocking said first hole when hydraulic fluid is passing from said flow divider first passage to said second or third passages.

24. The valve of claim 1, further comprising an on/off spool for selectively connecting and disconnecting the hydraulic pump to said first and second flow divider first passages.

25. The valve of claim 1, further comprising selectively openable bypass passages in each of said first and second flow dividers between said first passages and said second and third passages, whereby, hydraulic fluid is selectively passed directly between said first passage and said second and third passages without having to pass through said spools and poppets.

26. The valve of claim 25, further comprising an override spool for selectively opening and closing said bypass passages.

27. The valve of claim 26, further comprising an on/off spool for selectively connecting and disconnecting the hydraulic pump to said first and second flow divider first passages.

* * * * *